United States Patent
Dong

(10) Patent No.: US 9,116,403 B2
(45) Date of Patent: Aug. 25, 2015

(54) SUBSTRATE, DISPLAY PANEL AND DISPLAY DEVICE

(71) Applicant: Shenzhen China Star Optoelectronics Technology Co., Ltd., Shenzhen, Guangdong (CN)

(72) Inventor: Chengcai Dong, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 13/985,839

(22) PCT Filed: Jun. 27, 2013

(86) PCT No.: PCT/CN2013/078103
§ 371 (c)(1),
(2) Date: Aug. 15, 2013

(87) PCT Pub. No.: WO2014/190576
PCT Pub. Date: Dec. 4, 2014

(65) Prior Publication Data
US 2014/0354909 A1    Dec. 4, 2014

(30) Foreign Application Priority Data
May 31, 2013    (CN) .................. 2013 1 02139616

(51) Int. Cl.
*G02F 1/1362* (2006.01)
*G02F 1/1335* (2006.01)
*G02F 1/136* (2006.01)
*G02F 1/1343* (2006.01)

(52) U.S. Cl.
CPC .... *G02F 1/136286* (2013.01); *G02F 1/133514* (2013.01); *G02F 2001/13606* (2013.01); *G02F 2001/134318* (2013.01)

(58) Field of Classification Search
CPC ............ G02F 2001/134381; G02F 2001/13606
See application file for complete search history.

(56) References Cited

U.S. PATENT DOCUMENTS

| | | | | |
|---|---|---|---|---|
| 4,776,673 | A * | 10/1988 | Aoki et al. | 349/47 |
| 5,040,875 | A * | 8/1991 | Noguchi | 349/143 |
| 5,847,793 | A * | 12/1998 | Itoh | 349/110 |
| 7,034,905 | B2 * | 4/2006 | Sah et al. | 349/54 |
| 2006/0109411 | A1 * | 5/2006 | Kwon | 349/143 |
| 2007/0146608 | A1 * | 6/2007 | Jin et al. | 349/143 |
| 2007/0146609 | A1 * | 6/2007 | Lai et al. | 349/143 |
| 2009/0135209 | A1 * | 5/2009 | Takahashi | 345/690 |
| 2009/0257009 | A1 * | 10/2009 | Hirato | 349/110 |

* cited by examiner

*Primary Examiner* — Dennis Y Kim
(74) *Attorney, Agent, or Firm* — Andrew C. Cheng

(57) ABSTRACT

A display panel includes a first substrate and a second substrate. The second substrate disposes opposite to the first substrate and has multiple data lines and multiple scan lines disposed as a matrix. The first substrate at least divides into a first region and a second region. The first region of the first substrate disposes correspondingly to the scan lines and/or data lines on the second substrate, and the second region of the first substrate is disposed correspondingly to a remaining region which is located outside the scan lines and/or data lines on the second substrate. The first region of the first substrate and the scan lines and/or data lines forms a non-capacitance or a low capacitance structure. Therefore, the present invention can reduce the capacitance generated by the scan lines and/or the data lines so as to reduce the signal delay.

2 Claims, 3 Drawing Sheets

SUBSTRATE, DISPLAY PANEL AND DISPLAY DEVICE

BACKGROUND OF THE INVENTION

1. Field of the Invention

The present invention relates to a display field, and more particular to a substrate, a display panel and a display device.

2. Description of Related Art

In the current display device, the more widely used is the Liquid Crystal Display (LCD), and particularly the Thin Film Transistor (TFT) Liquid Crystal Display (referred to as TFT-LCD). With reference to FIG. 1, generally, the TFT-LCD includes a color filter substrate 110, an array substrate 120 and a liquid crystal 130. The color filter substrate 110 includes a glass substrate 111, a color resist layer 112, and an indium tin oxide (ITO) film 113. The array substrate 120 includes multiple scan lines 121, data lines 122, and multiple TFTs 123 connected with the scan lines 121 and the data line 122. The liquid crystal 130 is interposed between the color filter substrate 110 the array substrate 120. The TFT-LCD provides electrical signal to the TFTs 123 through the scan lines 121 and the data lines 122. An electric field is formed between the TFTs 123 and the ITO film 113 of the color filter substrate 110 to drive the liquid crystal 130 so as to achieve display.

Capacitors generated by the scan lines 121 or the data lines 122 may cause a signal delay at the scan lines 121 or the data lines 122. When the capacitors are larger, the signal delay at the scan lines 121 or data lines 122 is more critical correspondingly. At this time, it may cause undesirable phenomena such as an uneven brightness (mura) of the TFT-LCD.

In the conventional TFT-LCD, the main reason that the capacitor generated by the scan line 121 and/or data line 122 is that a capacitor will be formed between the ITO film 113 and the scan line 121 and/or data line 122. When the TFT-LCD is operating, because the electric signal of the scan line 121 of the array substrate 120 are changed, when a voltage of the scan line 121 and/or the data line 122 is different from a voltage of the ITO film 113 which is located above them, a capacitor will be formed between the ITO film 113 and the scan line 121 and/or the data line 122, which will generate a load so as to cause the signal delay.

SUMMARY OF THE INVENTION

The main object of the present invention is to provide a substrate, a display panel and a display device. They can reduce the capacitance generated by the scan lines and data lines so as to reduce the signal delay.

The technical problem solved by the present invention is to provide a display panel comprising: a first substrate at least divided into a first region and a second region; and a second substrate disposed opposite to the first substrate and having multiple data lines and multiple scan lines disposed as a matrix, at least one TFT, and an electrode, wherein, the at least one TFT respectively connects to the corresponding scan line, data line, and the electrode; wherein, the first region of the first substrate disposes correspondingly to scan lines and/or data lines on the second substrate, and the first region of the first substrate and the scan lines and/or data lines form a non-capacitance or a low capacitance structure; the second region of the first substrate is disposed correspondingly to a remaining region which is located outside the scan lines and/or data lines on the second substrate, and the least one TFT and the electrode are disposed inside the remaining region, and at least a part of the second region which is disposed correspondingly to the remaining region provides with an electrically conductive structure.

Wherein, the first region of the first substrate is made of an insulation material such that it forms a non-capacitance structure between the first region and the scan lines and/or the data lines.

Wherein, the display panel further comprises a liquid crystal interposed between the first substrate and the second substrate; the first substrate further comprises an electrically conductive film disposed inside the second region, and the first region does not be disposed with the electrically conductive film.

Wherein, the first substrate further comprises a glass substrate and a color resist layer, wherein, the glass substrate, the color resist layer, and the electrically conductive film are stacked sequentially, and the color resist layer is only disposed inside the second region and not disposed at the first region.

Wherein, the glass substrate located at the first region directly contacts with the liquid crystal.

In order to solve the above-mentioned technical problem, another technical solution provided by the present invention is a display device comprising: a display panel having a first substrate at least divides into a first region and a second region; and a second substrate disposed opposite to the first substrate and having multiple data lines and multiple scan lines disposed as a matrix; wherein, the first region of the first substrate disposes correspondingly to scan lines and/or data lines on the second substrate, and the second region of the first substrate is disposed correspondingly to a remaining region which is located outside the scan lines and/or data lines on the second substrate, wherein, the first region of the first substrate and the scan lines and/or data lines form a non-capacitance or a low capacitance structure.

Wherein, the first region of the first substrate is made of an insulation material such that it forms a non-capacitance structure between the first region and the scan lines and/or the data lines.

Wherein, the display panel further comprises a liquid crystal interposed between the first substrate and the second substrate; the first substrate further comprises an electrically conductive film disposed inside the second region, and the first region does not be disposed with the electrically conductive film.

Wherein, the first substrate further comprises a glass substrate and a color resist layer, wherein the glass substrate, the color resist layer, and the electrically conductive film are stacked sequentially, and the color resist layer is only disposed inside the second region and not disposed at the first region.

Wherein, the glass substrate located at the first region directly contacts with the liquid crystal.

In order to solve the above-mentioned technical problem, another technical solution provided by the present invention is a substrate comprising: a first region disposed correspondingly to scan lines and/or data lines on another substrate; and a second region disposed correspondingly to a remaining region which is located outside the scan lines and/or data lines on the another substrate; wherein, the first region is completely or partially an insulation structure.

Wherein, the substrate further comprises an electrically conductive film disposed inside the second region, and the first region does not be disposed with the electrically conductive film.

Wherein, the substrate further comprises a glass substrate and a color resist layer, wherein the glass substrate, the color resist layer, and the electrically conductive film are stacked sequentially, and the color resist layer is only disposed inside the second region and not disposed at the first region.

Wherein, the first region only provides with the glass substrate.

Comparing to the prior art, the present invention at least divides the first substrate into the first region and/or the second region. The non-capacitance structure or the low-capacitance structure formed between the first region which is disposed opposite to the scan lines and/or the data lines of the second substrate and the scan lines and/or data lines on the second substrate so as to reduce the capacitance between the first region of the first substrate and the scan lines and/or data lines on the second substrate. The capacitance generated by the scan lines and/or the data lines on the second substrate is reduced to achieve reducing the signal delay of the scan lines and/or the data lines.

DETAILED DESCRIPTION OF THE PREFERRED EMBODIMENT

The following content combines with the drawings and the embodiment for describing the present invention in detail.

Figure 2:
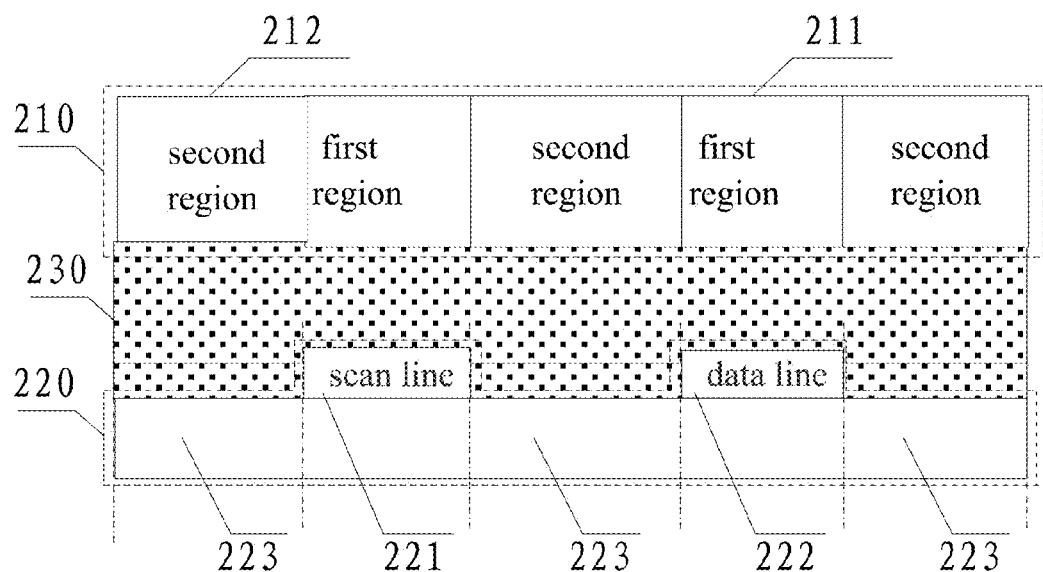
FIG. 2 is a schematic drawing of a display panel according to an embodiment of the present invention.
Figure 3:
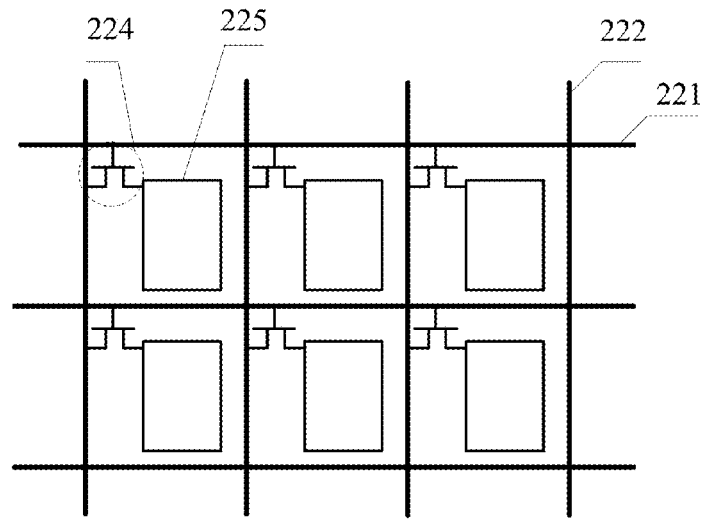
FIG. 3 is a schematic drawing illustrating a part of the second substrate of the display panel shown in FIG. 2.

With reference to FIG. 2 and FIG. 3, wherein FIG. 2 is a schematic drawing of a display panel according to an embodiment of the present invention, and FIG. 3 is a schematic drawing illustrating a part of the second substrate of the display panel shown in FIG. 2. In the present embodiment, the display panel includes a first substrate 210, a second substrate 220 disposed opposite to the first substrate 210, and a liquid crystal 230 interposed between the first substrate 210 and the second substrate 220.

Figure 4:
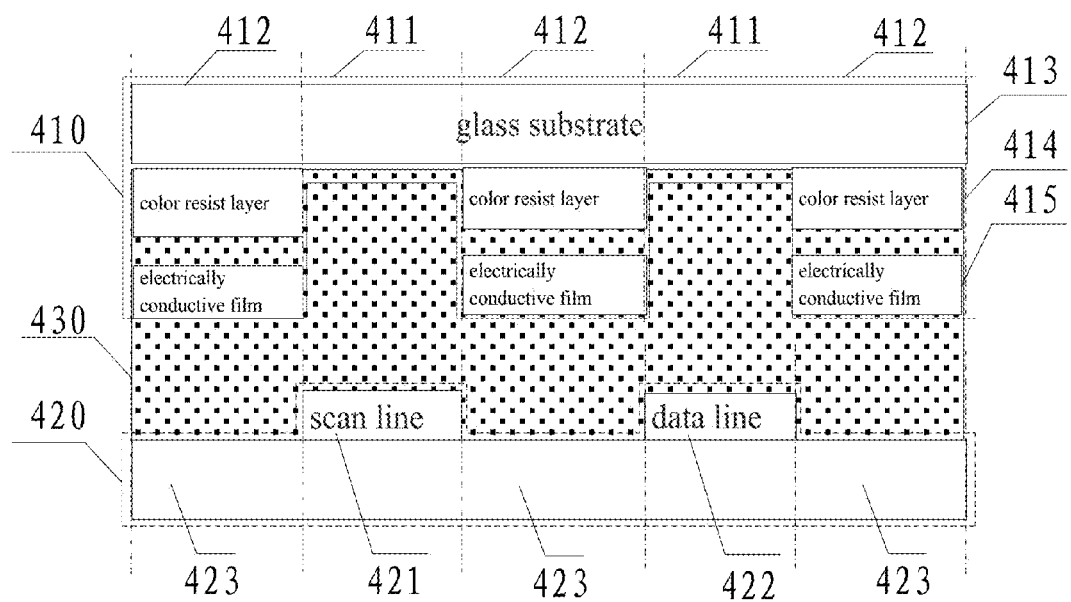
FIG. 4 is a schematic drawing of a display panel according to another embodiment of the present invention.
Figure 5:
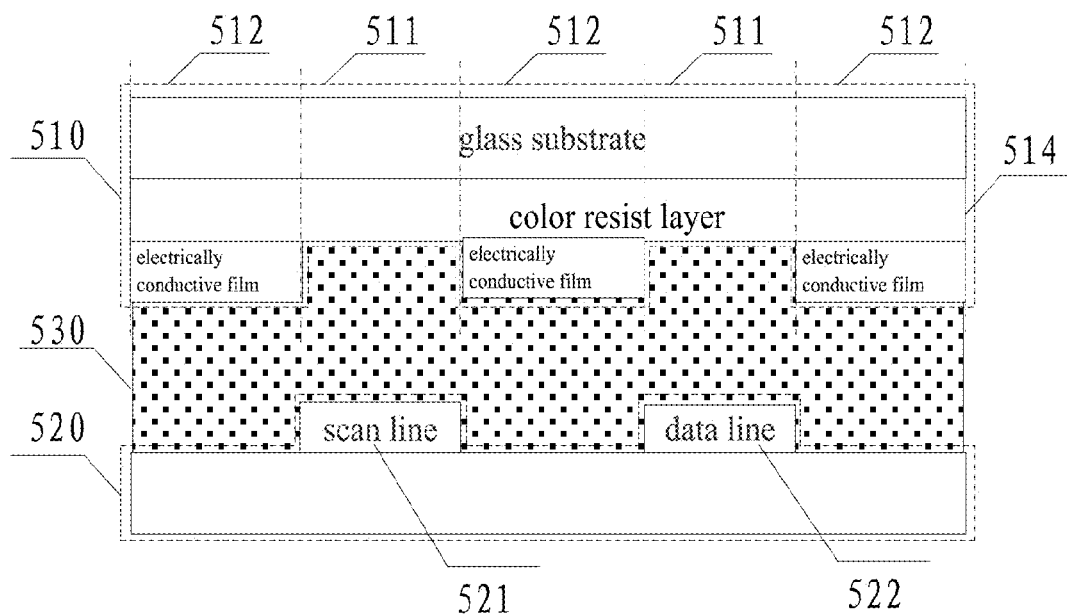
FIG. 5 is a schematic drawing of a display panel according to another embodiment of the present invention.

The second substrate 220 has multiple scan lines 221, data line 222 (for simplicity purposes, in FIG. 2, it only schematically shows a scan line and a data line; to facilitate, it only schematically shows the scan line and data line disposed at the same direction; however, in fact, the data lines and the scan lines are disposed as a matrix as shown in FIG. 3; the aforementioned FIG. 1, and the following FIG. 4, FIG. 5 are also similar), multiple TFTs 224 disposed at remaining region 223 which locates outside the scan lines 221 and data lines 222, and multiple electrodes 225. Three pins of each TFTs 224 are respectively connected to the corresponding scan line 221, data line 222, and the electrode 225. The second substrate 220 inputs signals to the scan lines 221 and data lines 222 through the TFTs 224 connected to them to control voltages of the electrodes 225 connected to the TFTs 224.

The first substrate 210 at least divides into a first region 211 and a second region 212. Wherein, the first region 211 of the first substrate 210 disposes correspondingly to scan lines 221 and data lines 222 on the second substrate 220. The first region 211 of the first substrate 210 is made of an insulation material 211 such that between the first region 211 and the second scan line 221 and the data lines 222 on the second substrate 220, it forms a non-capacitance structure. On the first substrate 210, the first region 211 locates right oppose to the scan lines 221 and data lines 222 does not form a capacitor between the first region 211 and the scan lines 221 and/or data lines 222.

The second region 212 of the first substrate 210 is disposed correspondingly to the remaining region 223 located outside the scan lines 221 and data lines 222 on the second substrate 220. At least a part of the second region 212 is an electrically conductive structure such that it forms an electric field between the electrically conductive structure and the electrode 225 of the second substrate 220. The second substrate 220 controls the voltage of electrodes 222 through the scan lines 221 and the data lines 225, so that it forms a electric field between the second electrodes 225 of the second substrate 220 and the electrically conductive structure of the second region 212 of the first substrate 210 to drive the liquid crystal to display. However, the LCD driving principle is the existing technology so that it does not specifically describes how to achieve display for the display panel of the present invention. If necessary, please refer to the relevant information about the display of the LCD.

In the prior art, the capacitor form between scan lines and data lines of the second substrate and the first substrate. The capacitance value of the capacitor is relating to the factors that if there exists an electrically conductive structure, and if there exists an electrically conductive structure, a size and a conductive ability of the electrically conductive structure. In the present invention, the first region 211 of the first substrate 210 which is disposed correspondingly to the scan lines 221 and data lines 222 on the second substrate 220 is made of the insulation material 211 such that between the first region 211 and the scan lines 221 and the data lines 222 of the second substrate 220, it forms a non-capacitance structure. Or, even if it forms a capacitor, the capacitance of the capacitor is smaller so as to decrease the delay effect of the scan lines 221 and the data lines 222. At the same time, because a region occupied by the scan lines 221 and the data lines 222 on the second substrate 220 is smaller, the insulation structure corresponds to the first region 211 of the first substrate 210 is smaller so that it will not produce larger impact for driving the liquid crystal 230.

It should be noted that the present invention, the first region of the first substrate is not limited to an insulation structure, in another embodiment, the first region of the first substrate can also a partial insulation structure or an electrically conductive structure with weaker conductance such that between the first region of the first substrate and the scan lines and data lines of the second substrate, it is a low capacitance structure.

Furthermore, in another embodiment, the first region of the first substrate may be provided with other structure which is capable for reducing the capacitor between the scan lines and the data line. For example, the first region and the second region are all electrically conductive structures. The first region of the first substrate relative to the scan lines and the data lines is disposed to be a concave structure such that a distance between the first region and the scan lines and data lines is larger so as to form a structure with a correspondingly low capacitance. The present invention does not limit a specific structure of the first region of the first substrate.

Figure 1:
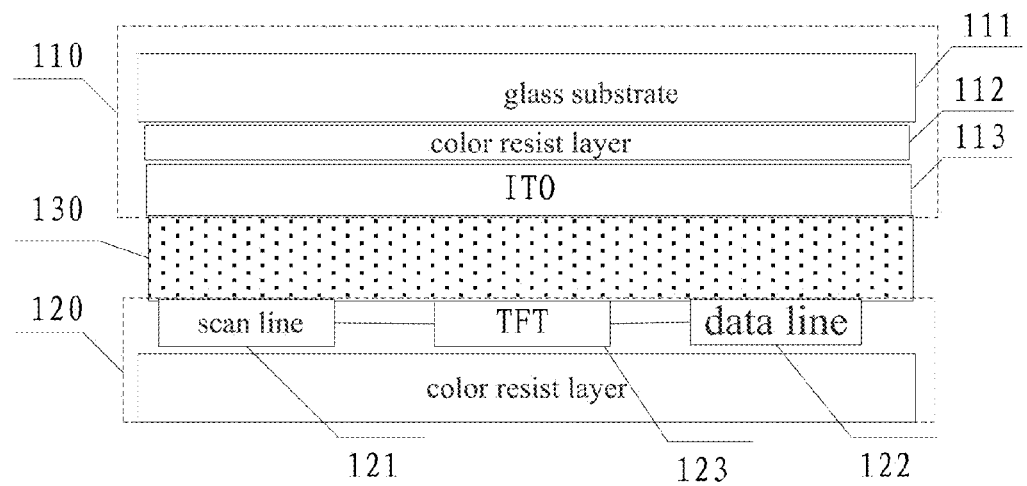
FIG. 1 is a schematic drawing of a TFT-LCD in the prior art.

Furthermore, it describes the low capacitance structure of the present invention. The low capacitance structure is: comparing to the conventional capacitor generated in the prior art, it forms by the ITO film of the first substrate which is disposed right opposite to the scan lines and the data lines of the second substrate (as shown in FIG. 1). The low capacitance structure of the present invention formed by the first region which is disposed right opposite to the scan lines and the data lines of the second substrate has a smaller capacitance comparing to the conventional capacitor.

With reference to FIG. 4, it is a schematic drawing of a display panel according to an embodiment of the present invention. In the present embodiment, the display panel includes a first substrate 410, a second substrate 420 disposed opposite to the first substrate 410, a liquid crystal 430 interposed between the first substrate 410 and the second substrate 420. The structure of the second substrate 420 is the same as the second substrate of the above embodiment, and it does not repeat here. The first substrate 410 is at least divided into a first region 411 and a second region 412. Wherein the first region 411 of the first substrate 410 disposes opposite to the scan lines 421 and the data lines 422 of the second substrate 420. The second region 412 of the first substrate 410 disposes opposite to the remaining region 423 which is outside the scan lines 421 and the data lines 422 of the second substrate 420.

Specifically, the first substrate 410 includes a glass substrate 413, a color resist layer 414 and an electrically conductive film 415, and they are stacked sequentially. Wherein, the glass substrate 413 is disposed at a side of the first substrate 410 away from the second substrate 420. The color resist layer 414 and the electrically conductive film 415 are disposed inside the second region 412. The first region 411 does not be disposed with the color resist layer 414 and the electrically conductive film 415. The first region 411 of the first substrate 410 only provides with the glass substrate 413, and the glass substrate 413 in the first region 411 contacts directly with the liquid crystal 430. The glass substrate 413 is an insulation element, and there does not provide with an electrically conductive element between the first region 411 of the glass substrate 413 and the scan lines 421 and the data lines 422 of the second substrate 420. Therefore, it will not form a capacitor between the first region 411 of the glass substrate 413 and the scan lines 421 and data lines 422 of the second substrate 420 so as to form a non-capacitance structure.

Meanwhile, it can form an electric field between the electrically conductive film 415 of the second region 412 of the first substrate 410 and an electrode (not shown) of the remaining region 423 which is disposed outside the scan lines 421 and the data lines 422 of the second substrate 420 so as to achieve a liquid-crystal display. In the present embodiment, the electrically conductive film 415 is an ITO film.

In another embodiment, the first region 411 of the first substrate 410 may partially dispose with an electrically conductive film. It forms a low-capacitance structure between the first region 411 of the glass substrate 413 and the scan lines 421 and data lines 422 of the second substrate 420. Therefore, it will reduce the capacitance generated by the scan lines 421 and the data lines 422 of the second substrate 420.

With reference to FIG. 5, it is a schematic drawing of the display panel according to another embodiment. The structure of the display panel in this embodiment is basically the same with the structure of the display panel in the above embodiments. The difference is that in this embodiment, a color resist layer 514 of a first substrate 510 is disposed at a first region 511 and a second region 512 of the first substrate 510. The color resist layer 514 inside the first region 511 directly contacts with a liquid crystal 530 which is interposed between the first substrate 510 and the second substrate 520. Because the color resist layer 514 is a low-conductivity element, it forms a low-capacitance structure between the first region 511 of the first substrate 510 and the scan lines 521 and data lines 522 of the second substrate 520 so as to reduce the capacitance generated by the scan lines 521 and the data lines 522 of the second substrate 520.

It should be noted that, for the convenience of description, the first region of all embodiments of the present application is disposed oppositely to the scan lines and data lines of the second substrate. However, it cannot limit the present invention for requiring that the first region must dispose oppositely to scan lines and data lines at the same time. In another embodiment for the actual requirement, the first region of the first substrate can only dispose opposite to the scan lines or the data lines so as to reduce the capacitance formed between the first substrate and the scan lines or the data lines of the second substrate.

In addition, in the embodiments of the present invention, the display panel is an LCD panel, but the present invention is not limited to the LCD panel. It may be other types of matrix display panels such as a plasma display. The present invention does not limit it.

Furthermore, in the present application FIG. 2 to FIG. 5 are simplified schematic drawings for facilitating the description of the present invention. In practical application, the display panel of the present invention may also include structures which are not shown in FIGS. 2 to FIG. 5 such as optical alignment films at the first and second substrates or a glass substrate at the second substrate. Similarly, if the other structure at the first substrate is an electrically conductive structure, it may only dispose at the second region such that the first region does not have conductivity, or the first region is partially provided with an electrically conductive structure. Therefore, it ensures that it forms a non-capacitance structure or a low-capacitance between the first region of the first substrate and the scan line and data line of the second substrate.

Comparing to the prior art, the present invention at least divides the first substrate into the first region and/or the second region. The non-capacitance structure or the low-capacitance structure formed between the first region which is disposed opposite to the scan lines and/or the data lines of the second substrate and the scan lines and/or data lines on the second substrate so as to reduce the capacitance between the first region of the first substrate and the scan lines and/or data lines on the second substrate. The capacitance generated by the scan lines and/or the data lines on the second substrate is reduced to achieve reducing the signal delay of the scan lines and/or the data lines.

Figure 6:
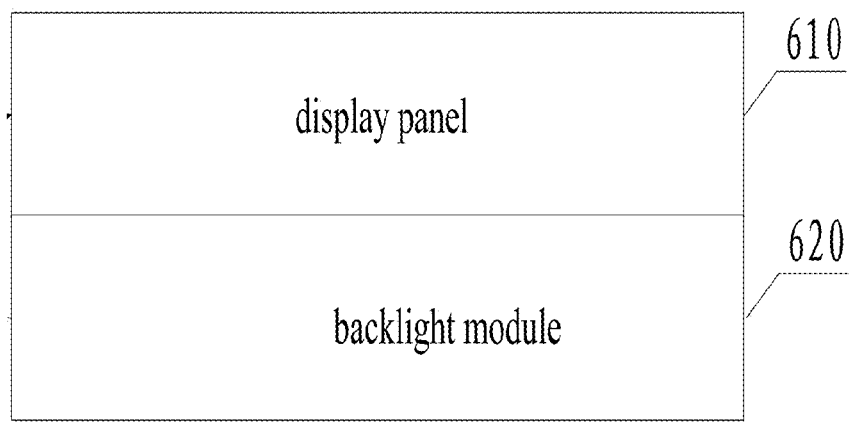
FIG. 6 is a schematic drawing of a display device according to an embodiment of the present invention.

With reference to FIG. 6, it is a schematic drawing of a display device according to an embodiment of the present invention. In the present embodiment, the display device includes a display panel 610 and a backlight module 620, wherein the display panel 610 is one of the display panels described at the foregoing embodiments. The specific implementation method can refer to the foregoing implementation method and FIG. 2 to FIG. 5. It will not discuss again here.

Of course, in another embodiment, the display device may not include a backlight. The display device of the present invention is an arbitrary device includes one of the display panels described at the above embodiments.

The present invention also provides an embodiment for a substrate. The substrate is at least divided into a first region and a second region. The first region of the substrate is disposed opposite to scan lines and data lines of another substrate. The second region is disposed opposite to the remaining region which is outside the scan line and the data line of the other substrate. The first region is an insulation structure. Specifically, the substrates comprise a glass, a color resist layer and an electrically conductive film substrate, and they are stacked sequentially. The color resist layer and the electrically conductive film is provided in the second region only, and the first region is only provided with the glass substrate.

In another embodiment of the present invention, the substrate is the first substrate of the display panel described in the foregoing embodiments. The specific implementation method can refer to FIG. 2 to FIG. 5 and description in the foregoing embodiments. It will not repeat again.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A display panel comprising:
   a first substrate at least divided into a first region and a second region; and
   a second substrate disposed opposite to the first substrate and having multiple data lines and multiple scan lines disposed as a matrix, at least one TFT, and an electrode, wherein, the at least one TFT respectively connects to a corresponding one of the scan lines, a corresponding one of the data lines, and the electrode;
   wherein, the first region of the first substrate is disposed correspondingly to the scan line and/or data lines on the second substrate, and the first region of the first substrate and the scan lines and/or the data lines form a non-capacitance structure; the second region of the first substrate is disposed correspondingly to a remaining region which is located outside the scan lines and/or the data lines on the second substrate, and the least one TFT and the electrode are disposed inside the remaining region, and at least a part of the second region which is disposed correspondingly to the remaining region is provided with an electrically conductive structure;
   wherein, the first substrate further comprises a glass substrate made of an insulation material;
   wherein, the display panel further comprises a liquid crystal interposed between the first substrate and the second substrate; the first substrate further comprises an electrically conductive film disposed inside the second region, and the electrically conductive film is not disposed within the first region;
   wherein the first substrate further comprises a color resist layer, wherein, the glass substrate, the color resist layer, and the electrically conductive film are stacked sequentially, and the color resist layer is only disposed inside the second region and not disposed at the first region; and
   wherein, the glass substrate located at the first region directly contacts with the liquid crystal.

2. A display device comprising:
   a display panel having
   a first substrate at least divides into a first region and a second region; and
   a second substrate disposed opposite to the first substrate and having multiple data lines and multiple scan lines disposed as a matrix;
   wherein, the first region of the first substrate is disposed correspondingly to the scan lines and/or the data lines on the second substrate, and the second region of the first substrate is disposed correspondingly to a remaining region which is located outside the scan lines and/or the data lines on the second substrate, wherein, the first region of the first substrate and the scan lines and/or the data lines form a non-capacitance structure;
   wherein, the first substrate further comprises a glass substrate made of an insulation material;
   wherein, the display panel further comprises a liquid crystal interposed between the first substrate and the second substrate; the first substrate further comprises an electrically conductive film disposed inside the second region, and the electrically conductive film is not disposed within the first region;
   wherein the first substrate further comprises a color resist layer, wherein the glass substrate, the color resist layer, and the electrically conductive film are stacked sequentially, and the color resist layer is only disposed inside the second region and not disposed at the first region; and
   wherein, the glass substrate located at the first region directly contacts with the liquid crystal.

* * * * *